United States Patent [19]

Peeters

[11] Patent Number: 5,090,268
[45] Date of Patent: Feb. 25, 1992

[54] TWO SPEED GEARBOX

[75] Inventor: Kenneth J. Peeters, Bear Creek, Wis.

[73] Assignee: H & S Manufacturing Co., Inc., Marshfield, Wis.

[21] Appl. No.: 609,662

[22] Filed: Nov. 6, 1990

[51] Int. Cl.$^5$ .............................................. A01C 19/02
[52] U.S. Cl. ................... 74/665 GC; 74/15.66; 239/672
[58] Field of Search ............ 74/665 GC, 15.66; 239/650, 670, 672

[56] References Cited

U.S. PATENT DOCUMENTS

| | | | |
|---|---|---|---|
| 1,961,809 | 8/1933 | Wood | 74/15.66 X |
| 2,019,073 | 10/1935 | Cooper et al. | 192/53 |
| 2,232,457 | 2/1941 | Holland | 192/18 |
| 2,940,321 | 6/1958 | Ruoff et al. | 74/15.66 X |
| 2,956,808 | 10/1960 | Miller | 239/670 |
| 2,968,188 | 1/1961 | Du Shane et al. | 74/15.66 X |
| 3,014,729 | 12/1961 | Henningsen et al. | 275/6 |
| 3,583,242 | 6/1971 | Thornbloom et al. | 74/15.2 |
| 3,887,153 | 6/1975 | O'Reilly et al. | 239/676 |
| 3,964,714 | 6/1976 | Crawford et al. | 239/662 |
| 4,404,868 | 9/1983 | Kleine | 74/665 GE |
| 4,480,735 | 11/1984 | Pingry | 192/48.3 |
| 4,498,630 | 2/1985 | Sadler | 239/677 |
| 4,732,330 | 3/1988 | Groeneveld et al. | 239/670 |

Primary Examiner—Leslie A. Braun
Assistant Examiner—William O. Trousdell
Attorney, Agent, or Firm—Patterson & Keough

[57] ABSTRACT

A transmission is provided for selectively redirecting motive power for operating material handling equipment and, in particular, agricultural implements such as manure spreaders or the like. An operator may selectively redirect power from a single input to one or both of two driven outputs. The transmission is contained in a compact, substantially sealed housing or gearbox containing a power train for each of the two output shafts and includes at least a pair of clutches, the axis of rotation of the clutches being substantially coaxial about the input shaft. The output of one of the clutches is transferred through a two speed gear to a transfer output shaft that is spaced apart from and parallel to the input shaft. A single shift linkage or operating control is provided whereby the operator may selectively redirect the input power.

8 Claims, 5 Drawing Sheets

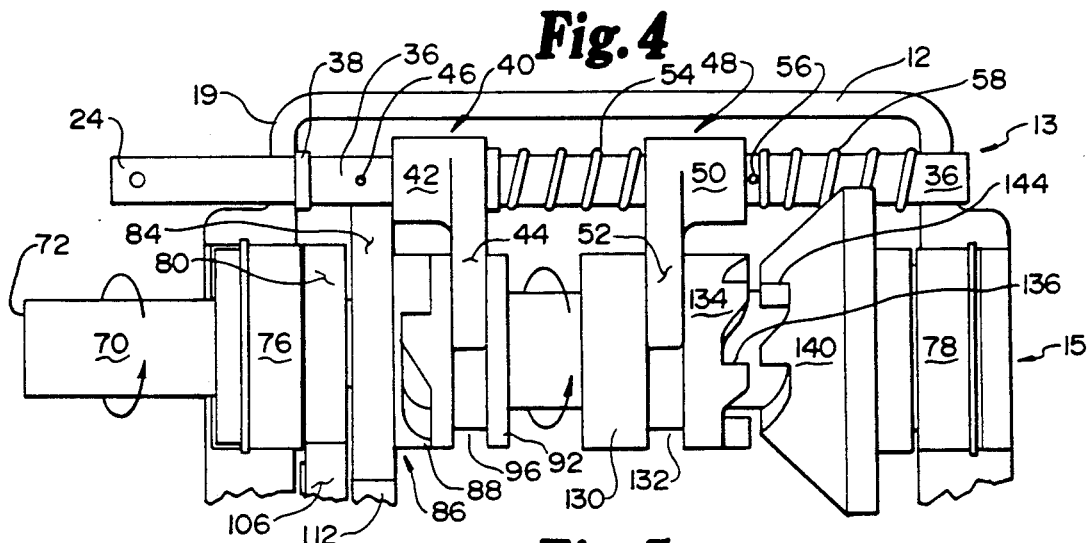
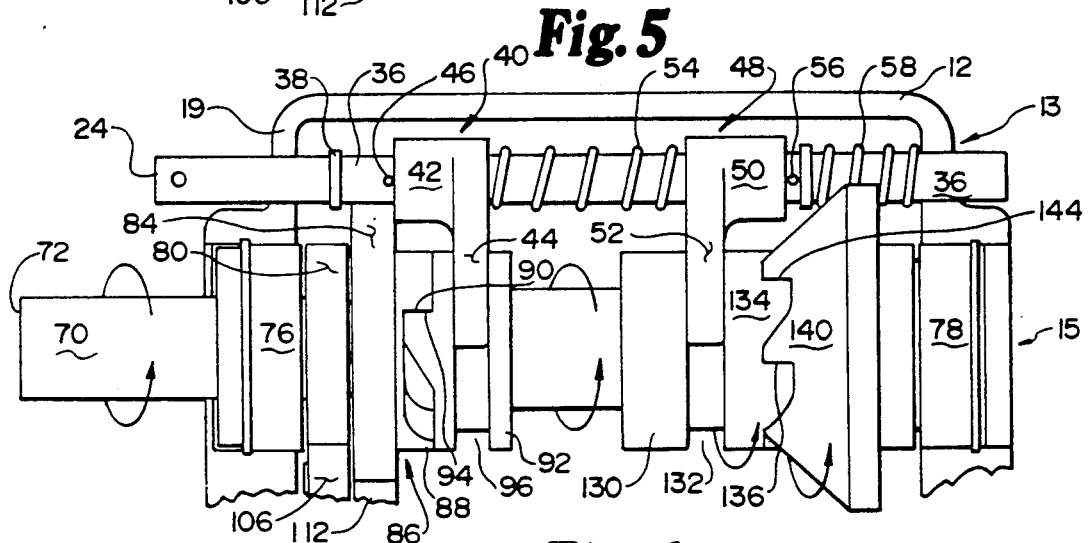
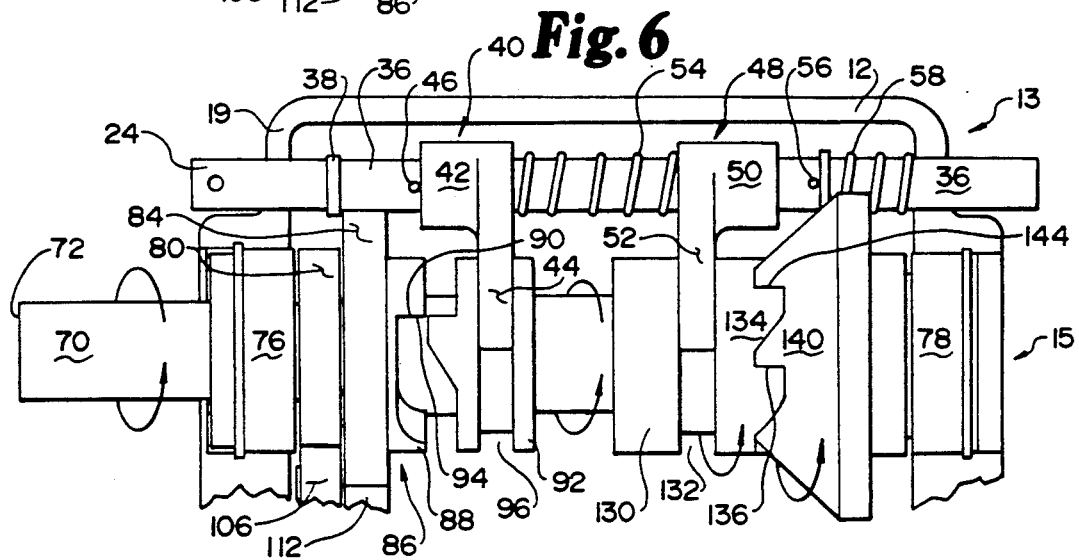

TWO SPEED GEARBOX

TECHNICAL FIELD

The present invention relates to transmission for use in the materials handling field. In particular, it relates to a gearbox especially adapted for use with wagon box type manure spreaders having a rearmost beater bar and a conveyor apron for moving the manure in the box into engagement with the beater bar. The gearbox includes a single shift linkage or operating control, having two clutches for selectively transferring power from a single input shaft to two output shafts oriented generally orthogonal to the input shaft and coupled to the beater bar and conveyor apron.

BACKGROUND OF THE INVENTION

Transmissions and devices for transferring or redirecting motive power are well known in many arts, typically in the form of interconnected driven and driving shafts or gears between a power source and a driven object. The interconnection between the various components of a transmission is made frequently by clutches, whereby the operation and speed of a driven item may be selectively controlled. Such transmissions and clutch mechanisms are disclosed in U.S. Pat. Nos. 2,019,073, 2,232,457 and 4,404,868.

In the material handling arts, U.S. Pat. Nos. 4,480,735 and 3,722,307 disclose that it is known to allocate power to more than one output from a single driving input. The '307 patent discloses a drive system for a manure spreader that includes a main drive shaft operatively connected to a spreading mechanism and a second drive shaft that is drivingly connected to an apron conveyor, wherein torque is transferred from the main drive shaft to the second drive shaft and wherein a clutch collar is keyed and slidable on the second shaft so that one portion of the spreader can be declutched without affecting the other driven portion. Somewhat similarly, U.S. Pat. No. 4,732,330 discloses an implement and drive gearbox wherein the gearbox includes two angularly offset clutches and direct gear drive is provided for one of the assemblies of the implement.

Other power coupling or transmission units for material handling equipment are disclosed in U.S. Pat. Nos. 3,014,729, 3,583,242, 3,887,153 and 3,964,714.

While the above prior art discloses improved transmission and clutch mechanisms for material handling devices, there are some remaining problems. For example, the desirability of enclosing a transmission so that it won't get clogged or filled with mud, ice or the like is suggested in the '868 patent, but accomplishing this while providing a compact, unitary gearbox or transmission housing for containing at least two drive trains is a problem not completely solved by the prior art.

It would be advantageous if a unitary, compact transmission could be provided wherein the gearbox, casing or housing of the transmission is penetrated by a minimum number of drive train connections, shifting linkages, other control linkages or the like. Moreover, a transmission or transfer case, particularly for use on material handling devices such as machines for agricultural use, should be as compact as possible. The width of gates and building doors, in conjunction with the needs for highway safety, hauling a sufficient payload and distributing power effectively, make it desirable to achieve an efficient transfer of power while using a minimum amount of valuable space and weight capacity.

When operating any type of material handling equipment, it would be desirable if the operator is required to manipulate only a limited number of controls or linkages, thereby keeping the hands as free as possible. Additionally, any controls that are provided ideally would require a minimum amount of manipulation to achieve the desired performance parameters of the device being operated.

A transmission should be structurally as simple as possible, thereby decreasing or minimizing maintenance costs and the probability of catastrophic failure.

A gearbox or transmission for use with devices having power driven features, particularly agricultural implements or material handling equipment, having a single operating control for selectively and variably redirecting power from a single input shaft to two output shafts, in a compact and sealed gearbox or transmission housing would be a decided improvement over the transmission and drive mechanisms disclosed in the prior art.

SUMMARY OF THE INVENTION

A transmission for selectively redirecting motive power for operating power driven devices including material handling equipment and, in particular, agricultural material handling implements such as manure spreaders or the like, is provided whereby an operator may selectively redirect power from a single input to one or both of at least two driven outputs.

The transmission is contained in a compact, substantially sealed housing or gearbox containing a power train for each of the at least two output shafts. A single shift linkage or operating control is provided whereby the operator may selectively redirect the input power. In the preferred embodiment, two clutches are contained in the housing in a substantially coaxial orientation. A two speed gear drive couples the input shaft to a transfer shaft spaced apart from and parallel to the input shaft, and one of the clutches is selectively engageable with the gear drive for operating the transfer shaft in one of two operating speeds.

BRIEF DESCRIPTION OF THE DRAWINGS

FIG. 4 is a simplified fragmentary, schematic diagram depicting the movable parts of the present invention with the lower drive train engaged in the high speed configuration, and the upper gear train disengaged;

FIG. 5 is similar to FIG. 4 but with the upper gear train engaged;

FIG. 6 is similar to FIG. 5, but with the lower gear train engaged in the low speed configuration.

DETAILED DESCRIPTION OF THE PREFERRED EMBODIMENT

Figure 1:
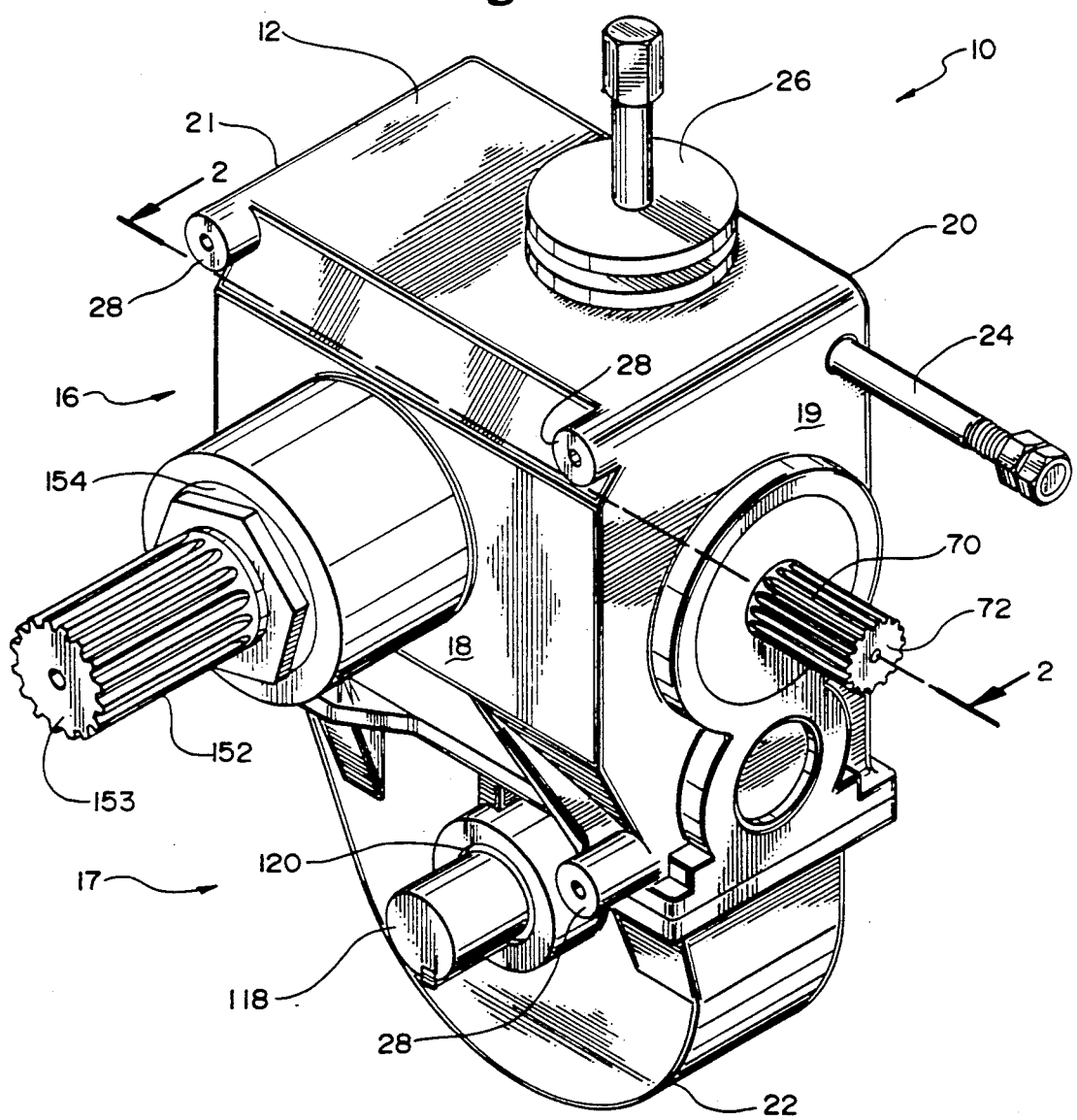
FIG. 1 is a perspective view of a two speed gear box in accordance with the present invention.

Referring to the drawings, the gearbox or transmission 10 of the present invention includes a housing 12, a shifting mechanism 13, a lower drive train 14 and an upper drive train 15. The drive trains 14, 15 provide two paths for transmitting motive power through the transmission 10 from the power input location to the power output locations.

The housing 12 is generally rectangular in cross section, including an upper portion 16 and a lower portion 17 having side walls 18, 19, 20, 21. As depicted in FIG. 1, the lower portion 17 may be arcuate or curved at bottom wall 22. Sidewall 18 is a power output side wall and side wall 19 is an input side wall. A shifting linkage or control rod connection 24 extends from the input side wall 19 and the housing may be provided with a lubricant fill hole or access port 26. Appropriate attachement features, for example, attachment mounts 28, may be provided as required on the exterior of the housing 12 so that the transmission 10 may be mounted on the implement with which it is being used.

Figure 2:
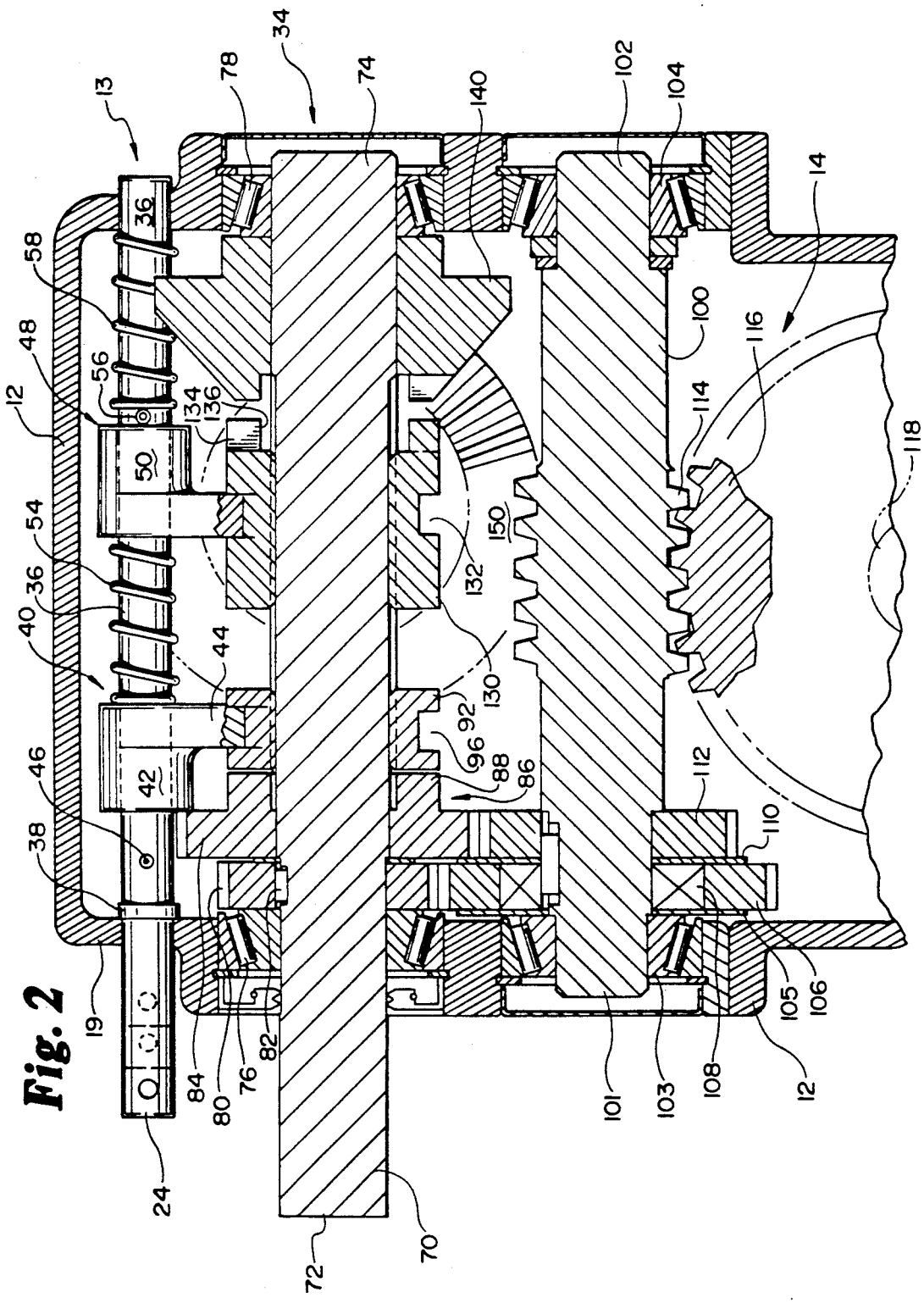
FIG. 2 is a fragmentary, sectional view of the present invention taken along line 2—2 of FIG. 1.
Figure 3:
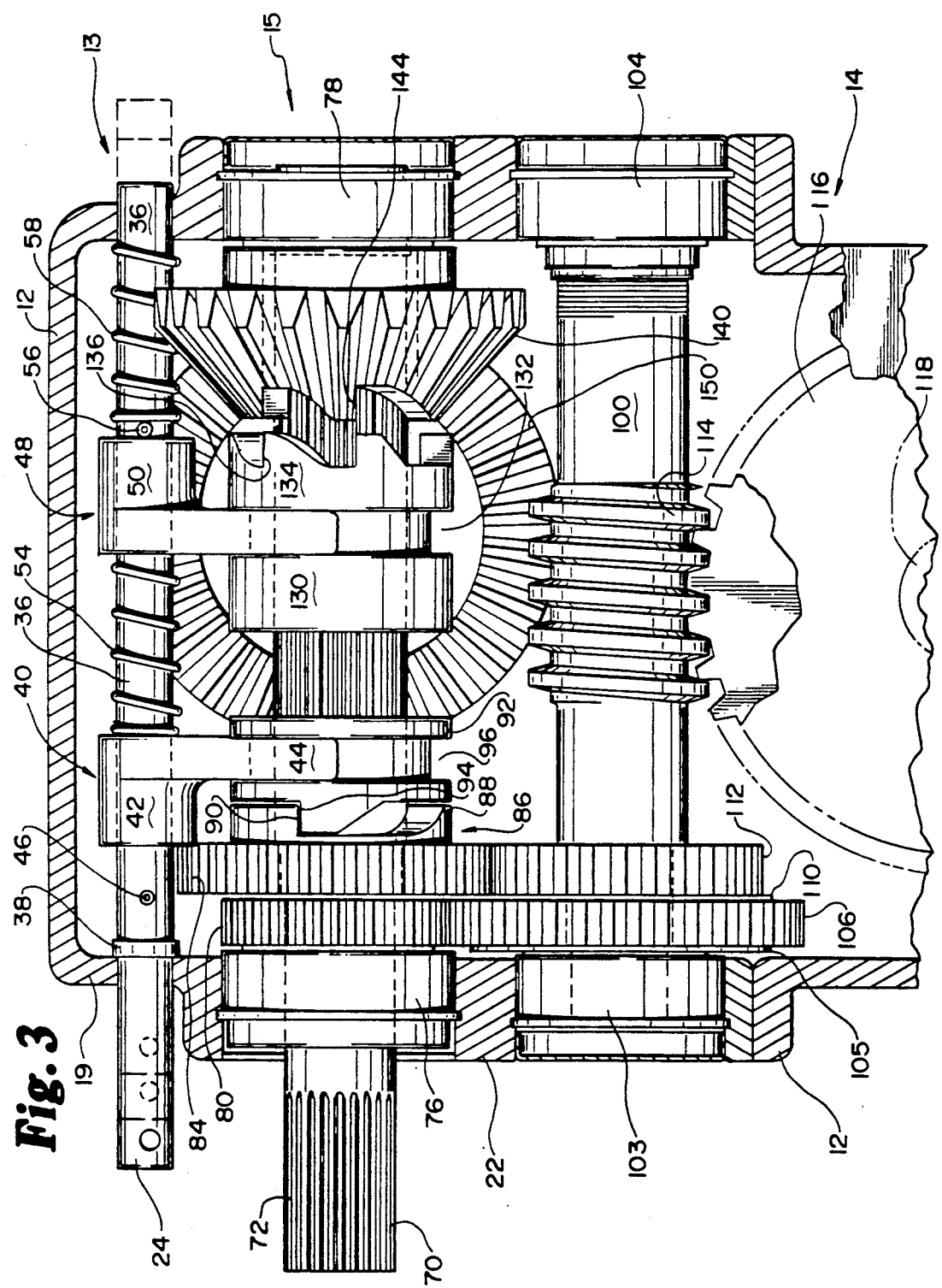
FIG. 3 is a fragmentary, side elevational view of the gear box.

The shift linkage connection 24 is connected to the shifting mechanism 13 depicted in FIGS. 2 and 3. With particular reference to those figures, the external portion of the shift linkage connection 24 is continued into the housing 12 and broadly provides the shifting mechanism 13.

The shifting mechanism or linkage 13 includes a shift rod 36. Just inside the gear box wall 19, a stop collar 38 is fixed to the shift rod 36. Inwardly of and linearly spaced from the collar 38, a first selector yoke 40 is slidably positioned on the shift rod 36. The first selector yoke 40 includes a circumferential base 42 and a bifurcated fork 44 extending therefrom. A stop pin 46 is located on the rod 36 between the collar 38 and the first selector 40.

A second selector yoke 48, including a circumferential base 50 and a bifurcated fork 52 extending therefrom, is slidably mounted on the shift rod 36 at approximately the midpoint thereof. Between the first selector yoke 40 and the second selector yoke 48, a first compression spring 54 is provided. On the other side of the yoke 48, a second stop pin 56 is provided, as well as a second compression spring 58. The stop pins 46, 56 limit the relative travel of the rod 36 and the yokes 40, 48 mounted thereon. The springs 54, 58 provide for smooth operation of the shift mechanism 13, as well as biasing the rod 36 in the direction toward the connection end 24 thereof.

The lower drive train 14 is depicted in FIGS. 2 and 3. A power input shaft 70 penetrates the side wall 19 of the transmission housing 12. The power input shaft 70 has an external splined end 72 and an internal end 74. The shaft 70 is supported near each end 72, 74 by thrust bearings 76, 78 inside the transmission housing 10. Roller-type thrust bearings are depicted, but any suitable thrust bearing configuration may be used.

The portion of the shaft 70 which is inside the housing 12 and between the thrust bearings 76, 78 supports a low speed input gear 80 fixed to the shaft 70 by a key 82. Just inwardly from the low speed input gear 80, a high speed input gear 84 is circumferentially mounted on the power input shaft 70.

The high speed input gear 84 has a clutch plate 86 attached thereto. The clutch plate 86 includes a high speed receiving crown 88 having strike faces 90. An internally splined sleeve 92 having strike faces 94, complementary to the strike faces 90 of the clutch plate 86, is slidably mounted on the shaft 70. The sleeve 92 has a generally central circumferential groove 96.

The lower drive train 14 also includes a counter or transfer shaft 100 having ends 101, 102. Shaft 100 is wholly internal in the housing 12 and is rotatably supported therein by a pair of thrust bearings 103, 104 at or near the ends 101, 102 thereof. At end 101 of the shaft 100, a low speed transfer gear 106 is provided. The low speed transfer gear 106 includes an overdrive or one way clutch 108 and is spaced from the thrust bearing 103 by a thrust washer 105. A second thrust washer 110 separates a high speed transfer gear 112 from the low speed transfer gear 106.

The counter shaft 100 carries a generally central worm drive 114. The worm 114 intermeshes with the worm driven gear 116 fixedly mounted to the lower power output shaft 118. The lower output shaft 118 extends through the side wall 18 of the housing 12 as depicted in FIG. 1. Appropriate seals 120 may be provided where the shaft 118 extends through the side wall 18.

FIGS. 2 and 3 also depict the upper drive train 15 of the transmission 10. As with the lower drive train 14, the upper drive train 15 receives input power through the power input shaft 70. Specifically, in the generally central area of the shaft 70, a second internally splined sleeve 130 is provided. The sleeve 130 includes a generally central circumferential groove 132 and a bevel input crown 134 with strike faces 136. Near the thrust bearing 78 a bevel input gear 140 is mounted on the power input shaft 70. The gear 140 includes a bevel receiving crown 142 having strike faces 144 complimentary to strike faces 136.

The upper drive train 15 also includes a bevel output gear 150 fixedly mounted inside the housing 12 on the upper power output shaft 152. The shaft 152 extends through the housing side wall 18, terminating in a splined end 153. As with shaft 118, appropriate seals 154 may be provided.

Operation of the transmission 10 is best understood with reference to FIGS. 4–6.

With the shift rod 36 in the position depicted in FIG. 4, the first selector yoke 40 and the fork 44 received in the central groove 96 has urged the sleeve 92 into contact with the clutch plate 86. The sleeve 92 is internally splined and therefore rotates at the same speed the input shaft 70 is rotating. Strike faces 90 of the sleeve 92 and the clutch plate 86 come into contact and the high speed gear 84 is thus driven. The high speed input gear 84 intermeshes with the high speed transfer gear 112 fixed to the shaft 100 by a key, thereby rotating the shaft 100 at a higher speed and speeding up the rotation of the shaft 118.

With continuing reference to FIG. 4, the low speed transfer gear 106, and particularly the internal one way clutch 108, allows the high speed input gear 84 and transfer gear 112 to drive the shaft 100 at a higher speed than the input shaft 70. The one-way clutch 108 is preferably a "free-wheeling" type clutch permitting free movement of the lower speed transfer gear 106 when the speed of the driven shaft, transfer shaft 100, exceeds that of the input shaft 70.

Referring to FIG. 5, the shift rod 36 is depicted as moved inwardly and through the interior of the housing 10 in the direction of the interior end 74 of the power input shaft 70. The second selector yoke 48, including the fork 52 received in the groove 132 of the second sleeve 130, shift to urge the bevel input crown 134 of the sleeve 130 into contact with the receiver crown 142 of the bevel gear 140. The bevel gear 140 is mounted so that the input shaft 70 may freely spin therein until the second sleeve 130, internally splined to rotate with the power shaft 70, comes in contact with the gear 140.

When this occurs, the gear 140 will be driven at the same rotational speed as the sleeve 130 and the power input shaft 70. The bevel gear 140 intermeshes and drives the bevel out put gear 150, thereby driving the upper power output shaft 152.

Both the lower and upper drive trains 14, 15 are driven by the input shaft 70, when the shift rod 36 is in the second position depicted in FIG. 5, transferring power from the input shaft 70 to the output shafts 118, 152. In the configurations depicted in FIGS. 4 and 5, the lower output shaft 118 is driven at high speed because of the engagement of the high speed input gear 84 and the sleeve 92. It is only in the configuration depicted in FIGS. 5 and 6, however, that the upper drive train 15 and shaft 152 are driven simultaneously with the lower drive train 14 and shaft 118.

Referring to FIG. 6, the shift rod 36 is depicted in a third operational position. Shifting the shift rod 36 from the position of FIG. 5 to the position of FIG. 6 disengages the high speed input gear 84 and the sleeve 92. As a result, the high speed input gear 84 idles and, as the transfer shaft 100 slows down, the one way clutch 108 in the low speed transfer gear 106 engages the shaft (or race mounted thereon), whereby the shaft 100 is driven at the lower speed. The upper drive train 15 continues to be driven through the intermeshing of the second sleeve 130 and the bevel gear 140.

Figure 7:
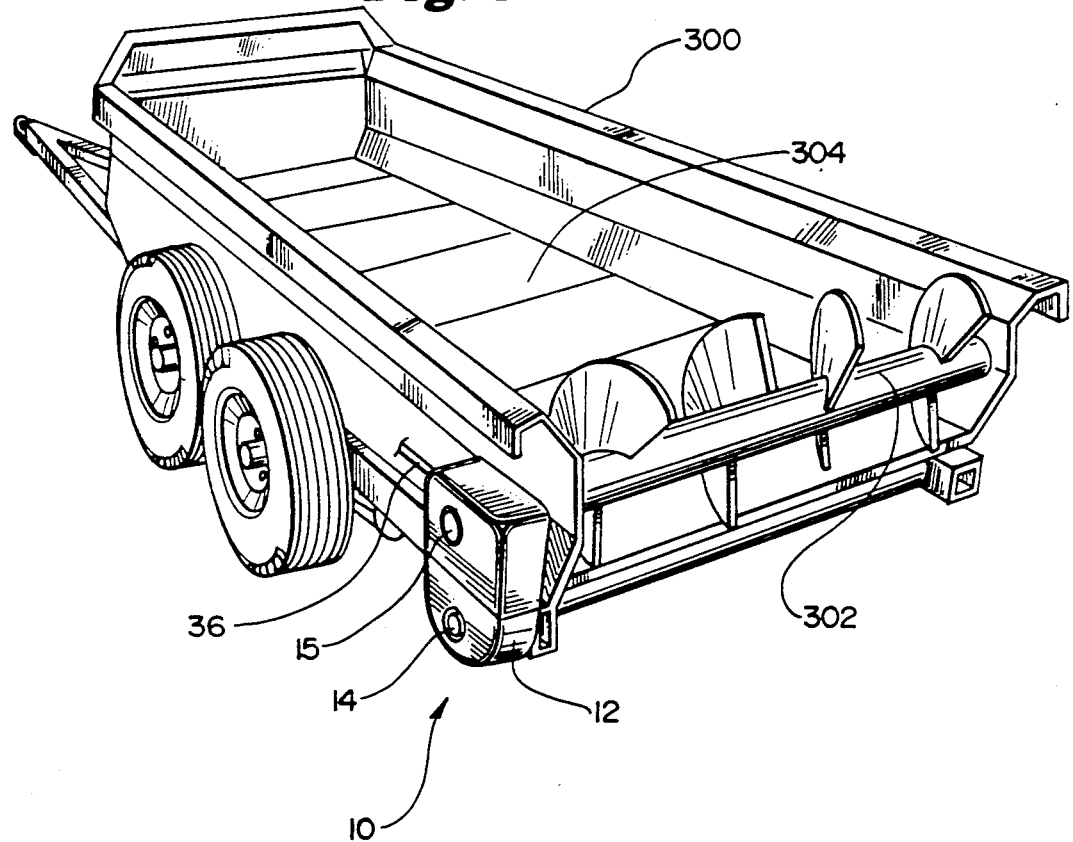
FIG. 7 depicts the present invention in use with an agricultural implement, specifically a manure spreader.

The transmission 10 of the present invention is depicted in use with a manure spreader 300 in FIG. 7. The manure spreader includes a beater assembly 302 and conveyor mechanism or web 304. The upper drive train 15 of transmission 10 is coupled to the beater assembly 302, and the lower drive train 14 is coupled to the conveyor web 304.

Manure carried by the spreader 300 is moved by the conveyor web 304 through the spreader 300 towards the beaters 302 to be thrown off and spread along a field as the spreader is towed through the field. To accomplish this, the lower shaft 118 of transmission 10 is connected to the conveyor web 304. To begin spreading the manure, the operational state depicted in FIG. 6 is selected by manipulating the power take off control of the towing vehicle (not shown) and the shift mechanism 13. The beater 302 (connected to the upper output shaft 152) is accordingly driven at the speed of the input shaft 70 through the upper drive train 15. At the same time, the lower drive train 14 drives shaft 118 (connected to the apron or conveyor mechanism 304) at a low speed through the low speed input gear 80 and low speed transfer gear 106. The low speed, rearward conveyor web 304 movement will cause sufficient and appropriate quantities of the manure to be moved into contact with the beater without clogging or jamming, thus assuring even distribution of the manure.

The operational configuration depicted in FIG. 5 is selected as the spreader 300 empties, by moving the shift mechanism 13 to the position depicted therein. The apron or lower drive train 14 is accordingly driven at a higher speed, due to the engagement of the high speed input gear 84 with sleeve 92. Operating the lower drive train 14 at a higher speed ensures that an adequate amount of manure is moved rearwardly to contact the beater 302 driven by the upper drive train 15, even with the amount of manure within the spreader reduced.

The operational position depicted in FIG. 4 is selected when the spreader 300 is substantially empty. Specifically, the upper drive train 15 and the output shaft 152 are stopped by moving the shift mechanism 13 into the position of FIG. 4. The second sleeve 130 is accordingly disengaged from gear 140, and the gear 140 idles on the still rotating power input shaft 70. The high speed input gear 84 and the sleeve 92 remain engaged. The conveyor 304 is accordingly driven at a high rate of speed, and causes "clean-out" of the spreader. Of course, while in transit to or from the loading and offloading point, the power input shaft 70, customarily driven by a power takeoff from a towing vehicle, will be stationary.

What is claimed:

1. An apparatus for selectively coupling a power input shaft defining a power input shaft longitudinal axis to first and second power output shafts, comprising;
   first gear means operably carried by said input shaft for selectively operably coupling said input shaft to said first power output shaft, including a first gear member operably, fixedly positioned along said power input shaft longitudinal axis and a second gear member shiftable between first and second positions along said power input shaft longitudinal axis;
   second gear means operably carried by said power input shaft for selectively operably coupling said input shaft to said second power output shaft, including a third gear member operably, fixedly positioned along said power input shaft longitudinal axis and a fourth gear member shiftable between third and fourth positions along said power input shaft longitudinal axis;
   actuating means for selectively shifting said second gear member and said fourth gear member between said first and second and said third and fourth positions respectively, comprising
   an actuating shaft defining an actuating shaft longitudinal axis oriented generally parallel to said power input shaft, and means mounting said actuating shaft for shiftable motion of said actuating shaft along said actuating shaft longitudinal axis relative to said power input shaft;
   first actuating member means shiftably carried along said actuating shaft longitudinal axis for operably coupling said actuating shaft to said second gear member;
   second actuating member means shiftably carried along said actuating shaft longitudinal axis for operably coupling said actuating shaft to said fourth gear member; and
   cam means operably carried by said actuating shaft for selective, mutually independent shifting of said first and second actuating member means relative to said power input shaft longitudinal axis for selective, mutually independent shifting of said second gear member and said fourth gear member between said first and second and said third and fourth positions respectively.

2. The apparatus as claimed in claim 1, said cam means comprising first stop means fixedly carried by said actuating shaft and engageable with said first actuating member means for shifting said second gear member from said first position to said second position.

3. The apparatus as claimed in claim 2, including first biasing means for urging said first actuating member means into engagement with said first stop means.

4. The apparatus as claimed in claim 3, said cam means comprising second stop means fixedly carried by said actuating shaft and engageable with said second actuating member means for shifting said fourth gear member from said third position to said fourth position.

5. The apparatus as claimed in claim 4, said first biasing means urging said second actuating member means into engagement with said second stop means.

6. The apparatus as claimed in claim 5, said first biasing means comprising first spring means operably carried by said actuating shaft.

7. The apparatus as claimed in claim 6, said first and second stop means comprising first and second stops spaced apart along said actuating shaft longitudinal axis, said first and second actuating member means being shiftably carried by said actuating shaft interposed between said first and second stops, said first spring means being interposed between said first and second actuating member means.

8. The apparatus as claimed in claim 7, including second biasing means for urging said second gear member into said first position and said fourth gear member into said fourth position.

* * * * *